June 8, 1971  E. V. WOODRUM  3,583,010
TOOL FOR OPTICAL DEVICES
Filed July 15, 1969

INVENTOR.
EMMETT V. WOODRUM
BY *W. B. Harpman*
ATTORNEY

# United States Patent Office 3,583,010
Patented June 8, 1971

3,583,010
TOOL FOR OPTICAL DEVICES
Emmett V. Woodrum, 564 Palmer Ave.,
Youngstown, Ohio 44502
Filed July 15, 1969, Ser. No. 841,883
Int. Cl. B25b *15/00;* B25f *1/00*
U.S. Cl. 7—1                     4 Claims

ABSTRACT OF THE DISCLOSURE

A combination screwdriver and vacuum cup for contact lenses is disclosed wherein the screwdriver is formed on a shank axially movable of a handle and the handle is flanged and appropriately shaped to receive and retain the vacuum cup so as to serve as a secondary handle for the screwdriver. The resiliency of the vacuum cup is used to urge the shank of the screwdriver axially of the handle. A snap on cap of a size sufficient to contain several small screws such as used in eyeglass frames and the like is provided for covering and enclosing the screwdriver portion of the device.

BACKGROUND OF THE INVENTION (1) Field of the invention

This invention relates to miniature screwdrivers as used in tightening and adjusting eyeglass frames and the like and vacuum or suction cups used for picking up and holding contact lenses.

(2) Description of the prior art

Prior devices relate solely to miniature screwdrivers and have included separate shank and body portions with means for partially caging the head of a screw adjacent the screwdriver tip. The present invention utilizes the vacuum cup as a means for tensioning the screwdriver shank urging it in one direction and as a carrier for the vacuum cup itself.

SUMMARY OF THE INVENTION

A tool for optical devices comprises a miniature screwdriver consisting of an elongated metal shank axially movable in a tubular body member which is provided with enlarged circular areas thereabout to make it convenient for holding and manipulating. The axial shank is of a cross sectional configuration matching the axial passageway in the holder so that it is non-rotative relative thereto although slidable longitudinally thereof. The vacuum cup which is separately usable as a means of picking up and holding contact lenses is carried on the handle of the screwdriver device and acts as a resilient member urging the screwdriver shank in one direction.

DESCRIPTION OF THE PREFERRED EMBODIMENT

Figure 1:
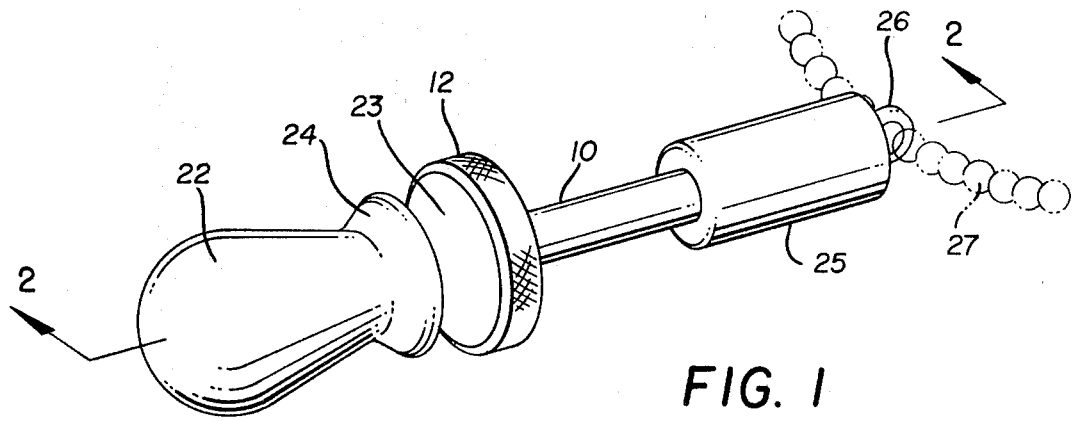
FIG. 1 is a perspective elevation of the tool for optical devices with a portion of a bead chain shown in broken lines to which the device is attached.

As illustrated herein, the tool for optical devices comprises a tubular body 10 which forms a handle of the device. An annular flange 11 having a knurled surface 12 is formed on the tubular body 10 approximately midway between its ends and a secondary annular flange 13 is formed thereon in spaced relation thereto with the intermediate area defining a U-shaped annular groove 14.

One end of the tubular body 10 has a small annular flange 15 thereabout and a concave configuration 16 surrounding the axial passageway 17 of the tubular body 10. A metal shank 18 is disposed in the passageway 17 and the shank 18 and the passageway 17 are of matching cross-sectional configurations so that the shank 18 is non-rotatable with respect to the passageway 17 while being movable axially thereof. The passageway 17 in the tubular body 10 is enlarged inwardly of the concave surface 16 as indicated by the numeral 19 and provides sufficient clearance for a screwdriver tip 20 on the shank 18 to move axially thereinto so that a round head screw engaged by the concave surface 16 of the tubular body may be engaged by the largely retracted screwdriver tip 20.

Those skilled in the art will observe that the concave area 16 thus holds the end of the tubular body 19 in registry with the round head screw or bolt while it is engaged by the screwdriver tip 20. The opposite end of the shank 18 is provided with an enlarged member 21 which controls the degree of movement of the shank 18 with respect to the passageway 17. A vacuum cup 22 having a feathered edge 23 and an annular enlargement 24 adjacent thereto is formed of resilient rubber like material and is capable of being distorted so as to be positioned on the secondary flange 13 with the feather edge 23 lying along one surface of the U-shaped annular groove 14.

It will be observed that when in such position the body of the vacuum cup 22 will engage the enlarged end 21 on the shank 18 and urge the shank 18 and the screwdriver tip 20 in a direction wherein the tip 20 is outwardly of the concave end 16 of the tubular body 10. Conversely, pressure applied to the device as upon moving it into engagement with a round headed screw or bolt will cause the shank 18 and the screwdriver tip 20 thereof to move in the opposite direction and distort the body of the vacuum cup 21 thereby holding the tip 20 in engagement in the slot of a screw or bolt engaged thereby.

Figure 2:
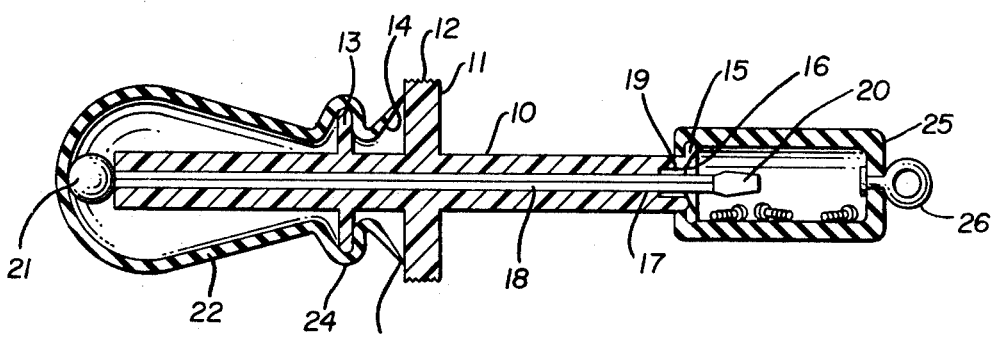
FIG. 2 is a vertical section on line 2—2 of FIG. 1.

As illustrated in FIGS. 1 and 2 of the drawings, a resilient snap on combination cover and container 25 is illustrated as being engaged over the small annular flange 15 on the ed of the tubular body 10. This snap on combination cover and container 25 protects the delicate screwdriver tip 20 and provides a carrier for extra bolts and screws as indicated therein in FIG. 2 of the drawings. An eyelet 26 on the combination cover and carrier 25 enables the entire device to be suspended from a key chain or the like. In FIG. 1 of the drawings broken lines indicate beads 27 in such a key chain or the like.

Figure 3:
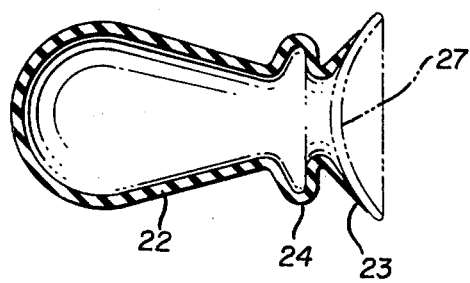
FIG. 3 is a cross-section of the vacuum cup portion of the device with broken lines indicating a contact lense being engaged thereby.

By referring now to FIG. 3 of the drawings, it will be seen that the vacuum cup 22 can be removed from the secondary flange 13 and used for picking up a contact lense 27. The size of the feather edge 23 of the vacuum cup being appropriate to the size of the contact lense 27 to be picked up and handled thereby.

It will thus be seen that a tool for optical devices has been disclosed which provides a miniature screwdriver in a protected environment and arranged for a convenient use and that it utilizes a vacuum cup as a contact lense pick up and handling device which is also usable as a resilient means urging the screwdriver tip and shank in a direction against a screw to be engaged thereby.

Although but one embodiment of the present invention has been illustrated and described, it will be apparent to those skilled in the art that various changes and modifications may be made therein without departing from the spirit of the invention and having thus described my invention, what I claim is:

1. A tool for optical devices consisting of a tubular body, a shank having a screwdriver tip thereon keyed in said tubular body for movement axially thereof, an enlarged annular flange on said tubular body, a vacuum cup having a feather edge and an area of enlarged diameter, a portion of said enlarged annular flange having a matching configuration with respect to said vacuum cup and the area of enlarged diameter thereof, said vacuum cup positioned on said tubular body and enlarged annular flange in engagement with said shank having said screwdriver tip thereo for urging said shank and screwdriver tip in one direction.

2. The tool for optical devices set forth in claim 1 and wherein the shank having a screwdriver tip thereon has an enlargement on the opposite end thereof with respect to the screwdriver tip, said enlargement being in engagement with the inner surface of said vacuum cup.

3. The tool for optical devices set forth in claim 1 and wherein the tubular body member has a small annular flange on the end thereof adjacent the screwdriver tip, a combination container and closure formed of resilient material for snap on registry with said small annular flange so as to enclose said screwdriver tip.

4. The tool for optical devices set forth in claim 1 and wherein the tubular body has an axial passageway which is square in cross-sectional shape and wherein the shank having the screwdriver tip thereon is square in cross-sectional shape and wherein the end of said tubular body adjacent said screwdriver tip is concave and the axial passageway is of a size sufficient to permit retraction of the screwdriver tip thereinto.

References Cited

UNITED STATES PATENTS

| | | |
|---|---|---|
| 559,843 | 5/1896 | Gulline. |
| 2,443,339 | 6/1948 | Blalock. |

EVON C. BLUNK, Primary Examiner

W. S. CARSON, Assistant Examiner

U.S. Cl. X.R.

81—3.5; 145—50; 294—1(CA), 64